Aug. 3, 1965
O. R. HUGGINS
3,198,464
AERIAL CABLE SUSPENSION CLAMP
Filed Sept. 5, 1962
3 Sheets-Sheet 1
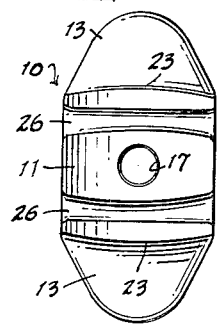
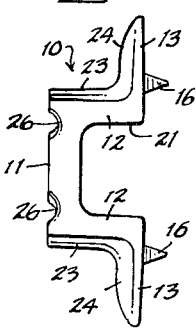
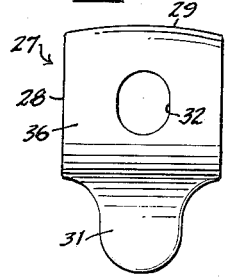
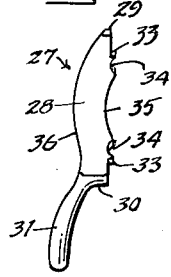
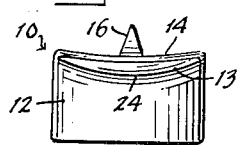
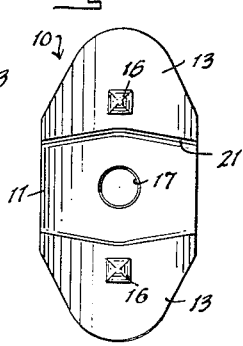
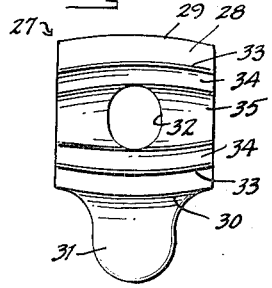
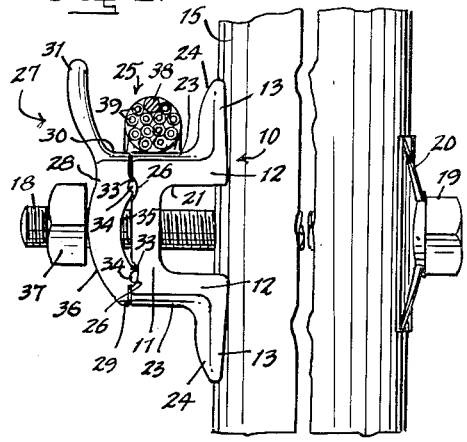
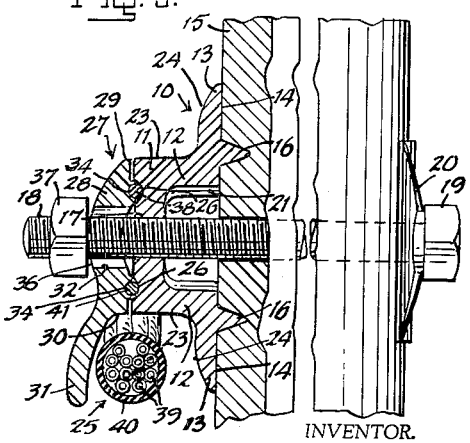
INVENTOR.
OWEN R. HUGGINS
BY
ATTORNEY

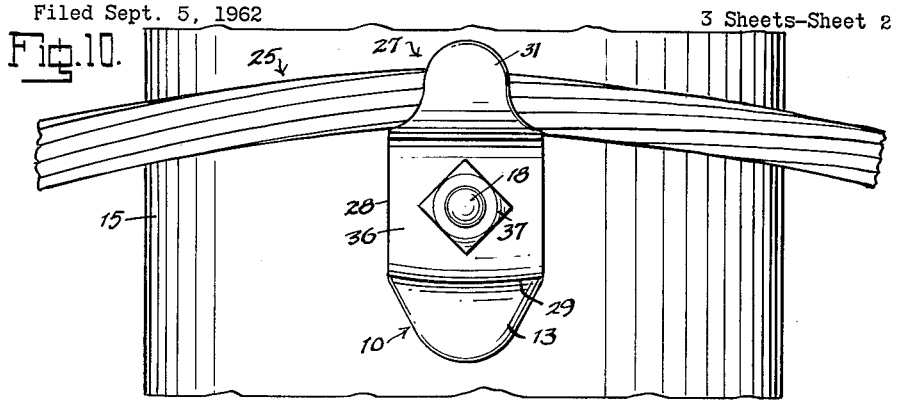
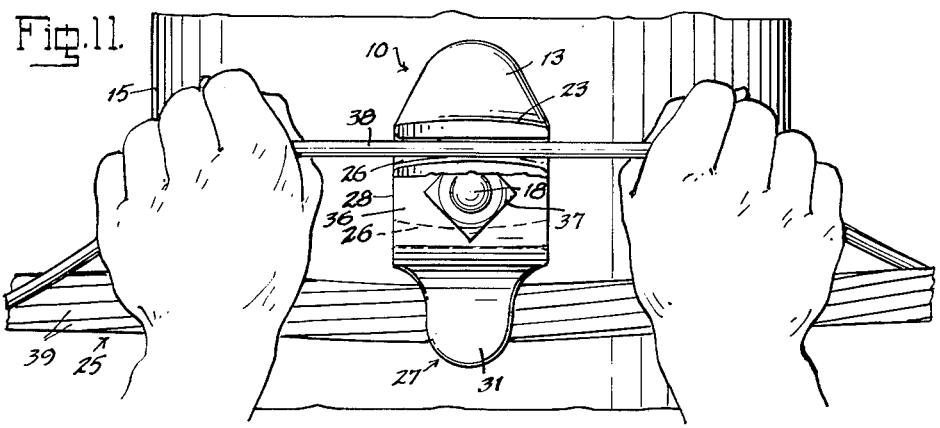
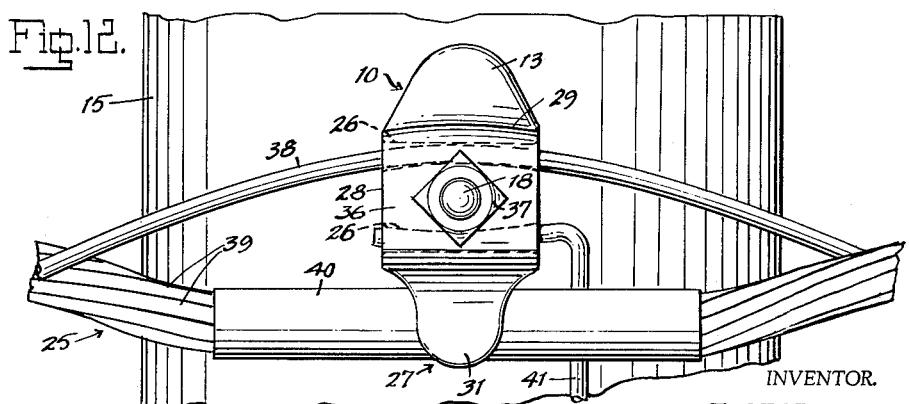

Aug. 3, 1965   O. R. HUGGINS   3,198,464
AERIAL CABLE SUSPENSION CLAMP
Filed Sept. 5, 1962   3 Sheets-Sheet 3
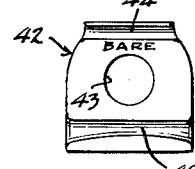
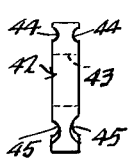
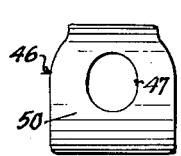
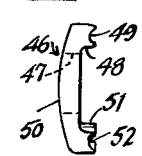
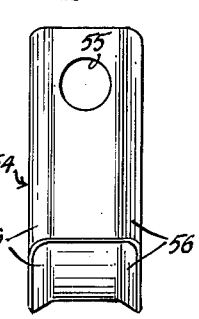
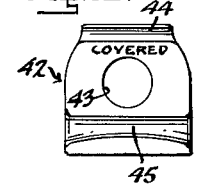
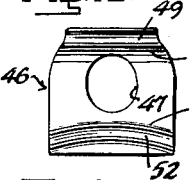
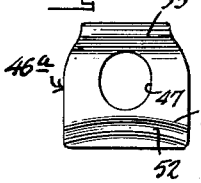
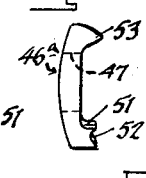
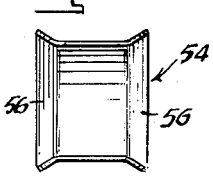
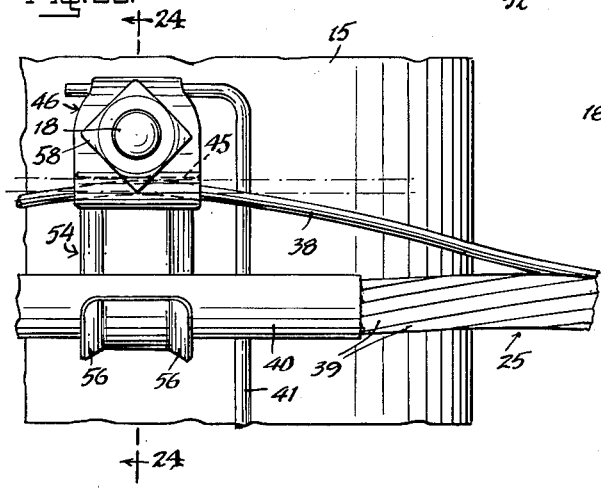
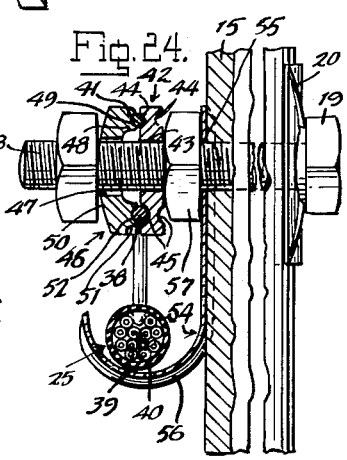
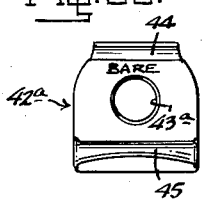
INVENTOR.
OWEN R. HUGGINS
BY
ATTORNEY.

United States Patent Office 3,198,464
Patented Aug. 3, 1965

3,198,464
AERIAL CABLE SUSPENSION CLAMP
Owen R. Huggins, New Canaan, Conn., assignor to Malleable Iron Fittings Company, Branford, Conn., a corporation of Connecticut
Filed Sept. 5, 1962, Ser. No. 221,481
5 Claims. (Cl. 248—67.5)

The present application is a continuation-in-part of my application for Aerial Cable Suspension Clamp, Serial No. 164,561 filed January 5, 1962, now abandoned.

The present invention relates to an aerial cable suspension clamp, particularly for attachment to a transmission line pole for supporting a multiple-wire cable, such for instance as employed in rural distribution or communication lines. Cable of this type comprises a group of communication wires provided as twisted strands of a single cable which also contains as a part of the group a messenger wire adapted to have short lengths drawn therefrom at the pole locations for the purpose of providing a series of suspension loops which are connected to the poles by clamps secured upon the poles. Cable clamps heretofore employed for this purpose have usually included a stringing hook for preliminary stringing of the cable and clamping means for securing the messenger wire loop after it has been separated from the cable, the clamping means usually having a straight clamping groove which facilitated reception of the messenger wire loop but resulted in sharp bends where the loop sagged at each side under the weight of the cable.

When placing the messenger wire in the clamp the lineman working at the clamp position on the pole grasps the separated messenger wire loop with his hands spaced apart and positioned at each side of its center portion and thereupon slips the center portion into the clamping groove of the clamp body. During this procedure the weight of the cable extending in either direction to adjacent poles must be supported by the lineman, with the result that the short length of messenger wire extending between his spaced hands assumes a straight position while the portions of the messenger wire extending outwardly from his hands sag downwardly under the weight of the cable. It would therefore be difficult if not impossible for the lineman while supporting the weight of the cable to shape the straight length of messenger wire extending between his spaced hands into an arch to fit into an arched groove having parallel upper and lower arched sides, nor would it be possible to fit the straight length of wire into such arched groove.

An object of the invention is to provide a cable clamp having messenger wire receiving and clamping means to enable the convenient engagement of the messenger wire loop following its separation from the cable, and which will support it in clamped position in downwardly arched position without producing sharp bends therein. It is proposed in attaining the foregoing object to provide a messenger wire receiving clamping groove in the clamp body which is substantially straight along the upper side to enable it to receive a straight length of the messenger wire loop while the same is being manipulated into place by the lineman, and which is arched along its lower side so that the messenger wire loop will assume a conforming arched shape free of sharp bends when the support of the cable is released by the lineman and assumed by the clamp.

An object of one modification of the invention is to provide a cable clamp having a reversible finger means which in a temporary position is upwardly projected to provide with the clamp body a trough support for the initial stringing of the cable from pole to pole, and which in its permanent position following the clamping of the messenger wire is downwardly projected, so that it does not present the hazard of an upwardly directed hook, and at the same time provides with the clamp body an inverted trough for retaining the suspended cable in its position adjacent the pole at points where the cable is cornered to extend in angular directions from a pole.

Another object of said one embodiment is to provide a clamp having a symmetrical clamp body whereby it may be placed upon the pole with either end of the top or the bottoms, thus facilitating the installation by the lineman and preventing the inadvertent placing of the clamp in an inverted position.

Another object is to provide a clamp having clamping means for a ground wire in such installations where it is desired to ground the clamp.

Other objects and adventages will be come apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:
FIG. 1 is a front elevation of the clamp body according to one embodiment of the invention;
FIG. 2 is a side elevation;
FIG. 3 is a top plan view;
FIG. 4 is a rear elevation of the clamp body;
FIG. 5 is a front elevation of the clamping plates;
FIG. 6 is a side elevation;
FIG. 7 is a rear elevation of the clamping plate;
FIG. 8 is a side elevation, partially broken away, showing the cable clamp mounted upon a pole with the clamping plate in its temporary position and the cable temporarily supported at the upper side of the clamp;
FIG. 9 is a vertical sectional view, partially broken away and partially in side elevation showing the cable clamp mounted upon a pole with the clamping plate in its permanent position in clamping engagement with the messenger wire loop, and with the cable suspended at the lower side of the clamp;
FIG. 10 is a front elevation showing a clamp and cable in the position as seen in FIG. 8;
FIG. 11 is a front elevation, partially broken away, showing the manner in which the cable is supported and manipulated by the lineman as the messenger wire is engaged with the clamp;
FIG. 12 is a front elevation showing the clamp and cable in the position as seen in FIG. 9;
FIG. 13 is a front elevation of a clamp body according to a modified form of the invention;
FIG. 14 is a side elevation;
FIG. 15 is a rear elevation;
FIG. 16 is a front elevation of the clamping plate;
FIG. 17 is a side elevation;
FIG. 18 is a rear elevation of the clamping plate;
FIG. 19 is a rear elevation of a modified form of clamping plate;
FIG. 20 is a side elevation of the clamping plate as seen in FIG. 19;
FIG. 21 is a front elevation of the stringer hook member;
FIG. 22 is a top plan view;
FIG. 23 is a front elevation, partially broken away, showing the modified clamp mounted upon a pole with the cable messenger wire in clamped position and the cable supported thereby;
FIG. 24 is a vertical sectional view taken along the line 24—24 of FIG. 23; and FIG. 25 is a front elevation of a modified form of clamp body.

Referring to the drawings, and more particularly to FIGS. 1–12, the cable suspension clamp according to the exemplary embodiment of the invention shown therein comprises a clamp body 10 having an outwardly offset forward wall portion 11 connected at its upper and lower ends to transverse walls 12—12, the rearward ends of which are respectively provided with upwardly and downwardly extending pole-engaging pad portions 13—13 transversely curved at their rearward surfaces 14 to substantially conform to the circumferential surface of the wood pole 15 to which the clamp is adapted to be attached. Prong projections 16 are provided along the central lines of the curved surfaces 14 for imbedding into the wood pole.

The forward wall 11 is provided centrally with a through bolt receiving threaded hole 17 for engagement by the projected threaded end of a through bolt 18 extending diametrically through the pole, the opposite end of the through bolt having a head 19 engaging a curved bearing washer 20 interposed between the head end and the pole. It will be understood that instead of having a head the opposite end of the through bolt may be threaded and have a nut screwed thereon. The hole 17 opens to a recess 21 defined by the forward wall 11 and the upper and lower walls 12—12, so that the forward wall 11 is outwardly offset from the pole surface. The clamp body is secured upon the pole with its prong projections embedded therein through turning of the through bolt from the rear of the pole by engaging a wrench with the head 19, or in the case of a nut upon the rear end of the pole through tightening of the nut.

The outer surfaces of the upper and lower walls 12 are transversely curved as at 23 and merge with the transversely curved surfaces 24 of the pad portions 13, so that in the preliminary stringing of a cable 25 as seen in FIGS. 8 and 10 the upper surface 23 will substantially conform to the curvature of the cable as it is strung from pole to pole, thus preventing sharp bends therein and providing a smooth surface free of sharp corners for sliding contact of the cable during the stringing operation.

The face surface in the forward wall 11 is provided above and below the central hole 17 with grooves 26 of substantially semi-circular cross section, the upper side of the upper groove and the lower side of the lower groove being horizontal and parallel to each other and the lower side of the upper groove and the upper side of the lower groove being curved in substantially parallel relation to the curvature of the surfaces 23 of the upper and lower walls 12, for a purpose presently to more fully appear.

The clamping member 27 comprises a clamping plate portion 28 substantially conforming in outline to the outline shape of the face of the forward wall 11 of the clamp body 10, so that its transverse edge surfaces 29 and 30 conform to the curved surfaces 23 of the upper and lower walls 12 of the clamp body in either the temporary position as seen in FIGS. 8 and 10 or in the permanent position as seen in FIGS. 9 and 11. A curved finger portion 31 projects from the edge surface 30. A substantially oval through bolt receiving hole 32 is provided centrally of the clamping plate portion 28 and at its inner side respectively above and below the hole there are provided arcuate rib portions 33—33 each having a wire engaging groove 34. The radius of curvature of the rib portions corresponds to the radius of curvature of the curved sides of the grooves 26 of the clamp body and they are adapted as seen in FIG. 8 to fit within these grooves. The inner side of the clamping plate portion is recessed as at 35 between the ribs 33 and the outer side is convexly curved as at 36 for line contact of the clamping nut 37 engaged upon the projected threaded end of the through bolt, so that in any clamping position of the clamping plate the nut will be firmly engaged therewith.

In the temporary position of the clamp as seen in FIGS. 8 and 10 the finger 31 projects upwardly in forwardly opposed relation to the upper pad portion 24 of the clamp body with the upwardly disposed curved side 30 of the clamping plate forming a continuation of the upper curved surface 23 of the clamp body. An upwardly disposed trough is thus provided in which the cable 25 is engaged and retained during the stringing of the cable from pole to pole, the curvature of the cable at the point engaged with the clamp substantially conforming to the curvature of the surfaces 23 and 30 so that it is free to slide upon the clamp without producing sharp bends and without frictional resistance from the corners of the clamp.

The cable 25 is a multiple wire cable of the type employed in rural distribution and communication lines wherein a messenger wire 38 is provided in the group of distribution wires 39. In practice a short length of the messenger wire may be pulled by the lineman from the group of wires to provide a suspension loop, and this operation is usually performed by the lineman working upon the pole. Thereupon a longitudinally split insulator sleeve 40 is engaged about the intervening section of the cable to protect it from contact with the clamp, as will presently more fully appear. Preliminary to clamping the messenger wire the lineman backs off the clamping nut 37 and reverses the position of the clamping plate so that the finger portion 31 is at the lower side of the clamp to form with the lower side of the clamp body an inverted trough as seen in FIG. 9. With the clamping plate in an open position the lineman may then conveniently grasp the separated messenger wire loop at each side of its center portion as seen in FIG. 11 and slip it into engagement with the upper groove 26 of the clamp body, the straight upper side of this groove providing in effect a straight groove, so that it readily receives the straight portion of the messenger wire extending between the spaced hands of the lineman, the wire assuming this position as a result of the weight of the sagging cable extending outwardly from the lineman's hands to the adjacent poles. The lineman is therefore not required to exert force upon the messenger wire to arch it as would be required in fitting the wire into an arched groove having arched upper and lower sides. When so engaged the messenger wire is allowed to conform to the arched lower side of the groove and the nut 37 is tightened to cause the upper rib 33 of the clamping plate to clamp the messenger wire with the suspended cable disposed within the lower trough of the clamp as seen in FIGS. 9 and 12. During the clamping operation the lower rib 33 of the clamping plate will fulcrum in the lower groove 26 of the clamp body through direct engagement therewith, or when desired a ground wire 41 may be clamped in the lower groove 26, in which case this wire serves as a fulcrum for the clamping plate as it is tightened into engagement with the messenger wire.

In FIGS. 13–24 there is illustrated a modified form of the invention comprising a clamping body 42 in the form of a generally rectangular plate member having substantially flat parallel faces at its opposed sides and provided centrally with a through bolt receiving hole 43. In spaced relation above the hole 43 there is provided upon each face a transversely extending straight fulcrum groove 44 of substantially semi-circular cross-section, and in spaced relation below the hole there is provided in each face a transversely extending messenger wire receiving groove 45 of semi-circular cross-section having a straight upper side and a convexly arched lower side. The grooves 45 at the respective sides are of different cross-sectional size, so that by placing one or the other sides outwardly messenger wires of different gauge may be accommodated over the normal range of sizes of such wires. Also, in the case of a covered or insulated messenger wire, which in some installations remains covered and in others is bared by removal of the insulation, the larger groove may be used for the covered wire and the smaller groove may be used for the bared wire. For the purpose of aiding the lineman in properly placing the body member upon the through bolt the respective sides of the body member containing the small and large grooves 45 may be designated by the legends "Bare" and "Covered" cast or otherwise suitably provided thereon.

The clamping plate member 46 is of substantially the same outline shape as the body member and is provided centrally with a through bolt receiving hole 47 of vertically elongated oval form for the purpose of allowing swinging movement relatively to the through bolt, as will hereinafter more fully appear. At its inner side and adjacent its upper edge there is provided a horizontal rib portion 48 having a horizontal fulcrum groove 49 complementary to the groove 44 of the body member, the fulcrum being provided by a ground wire 41 as seen in FIG. 24. The outer side of the clamping plate member is convexly curved as at 50 for line contact of a clamping nut so that in any position of the clamping plate member the nut will be firmly engaged therewith. Adjacent the lower edge of the clamping member there is provided a projecting rib 51 having a clamping groove 52 adapted to clampingly engage a messenger wire engaged in the groove 45 and supported against the lower convexly arched side of the groove 45, the radius of curvature of the groove 52 corresponding to the radius of curvature of the arched lower side of the groove 45.

In an installation where a ground wire 41 is not employed a modified clamping plate 46a as seen in FIGS. 19 and 20 is provided in which a horizontal projecting rib 53 of substantially V-shape in cross-section to directly engage the groove 44 of the clamp body to serve as a fulcrum.

A stringing hook member 54 adapted to be assembled upon the through bolt in engagement with the pole is provided near its upper end with a centrally disposed through bolt receiving hole 55. This hook member is preferably formed of sheet metal and is provided along its side edges with angularly bent flanges 56 which enable the rearward side of its vertical portion to firmly engage the rounded surface of the pole 15 without turning about the through bolt, impart rigidity to the sheet metal structure, and provide the lower hook portion with a generally convex guide surface to enable the convenient stringing of the cable 25 without chafing preliminary to clamping the messenger wire 38.

As seen in FIG. 24 the suspension clamp is assembled upon the projected threaded end of the through bolt 18 by first engaging the stringing hook member 54 therewith and securing it firmly against the pole by a nut 57, then engaging the clamp body 42 at the outer side of the nut 57 in outwardly spaced relation to the pole, next engaging the clamping plate 46 outwardly of the clamp body, and finally screwing a nut 58 upon the through bolt to engage the outer convex side of the clamping plate.

As in the first embodiment of the invention illustrated in FIGS. 1–12, the cable 25 is first strung from pole to pole by supporting it in the stringing hook members, whereupon the lineman working on the pole pulls a short length of the messenger wire 38 from the group of distribution wires 39, having first loosened the clamping plate member 46. He then grasps the messenger wire in the manner seen in FIG. 11, with the portion of the wire between his spaced hands in a straight position due to the weight of the cable, and raises it into engagement with the groove 45 in the straight position as indicated by the dot-and-dash lines in FIG. 25. With the wire thus positioned in the groove he relinquishes his support sufficiently to allow the messenger to assume the arched position as shown by full lines in FIG. 23 in engagement with the lower side of the groove 45, at which point the nut 58 is tightened to press the clamping plate member into clamping engagement with the messenger wire. The cable is thus supported from the clamp within the lower hook portion of the hook member but normally out of contact therewith as shown in FIG. 24. A split insulator sleeve 40 is preferably fitted upon the cable to protect it against chafing engagement with the hook member.

In FIG. 25 there is illustrated a modified form of a clamping body 42a provided with a threaded through bolt receiving hole 43a for threaded engagement by the through bolt.

What is claimed is:

1. In a cable suspension clamp for mounting on a vertical pole, a horizontal through bolt for engaging diametrically through said pole with a threaded end projecting at one side, a clamp body having a hole through which said through bolt is received, a clamping plate having a hole through which said through bolt is received, and a nut screwed upon said bolt having clamping engagement with said clamping plate, said clamp body having a fulcrum groove at one side of said hole and a messenger wire receiving groove at the other side of said hole, said messenger wire receiving groove of said clamp body having a substantially straight horizontal upper side and a convexly arched lower side whereby a messenger wire is engageable therewith in a substantially straight horizontal position and may thereupon assume a convexly curved position in engagement with the lower convexly arched side of said groove and said clamping plate having fulcrum means for cooperation with said fulcrum groove of said clamp body and a messenger wire receiving groove having arched parallel upper and lower sides to conform to and clampingly engage said arched messenger wire along upper and lower sides thereof when said messenger wire is engaged with the lower arched side of said messenger wire receiving groove of said clamp body.

2. In a cable suspension clamp for mounting on a vertical pole, a horizontal through bolt for engaging diametrically through said pole with a threaded end projecting at one side, a clamp body comprising a forward wall having a vertical forward planar face and a central bolt receiving hole extending therethrough at right angles to said forward face through which said through bolt is received, said face having a pair of wire receiving grooves extending between its side edges and respectively spaced above and below said hole, upper and lower walls having outer surfaces convexly curved between their side edges and extending horizontally rearwardly from the upper and lower ends of said forward wall, and pole engaging pad portions respectively extending upwardly and downwardly from the rearward ends of said upper and lower walls, said clamp body being symmetrical above and below the axis of said hole whereby it presents an identical structure with either pad portion at the top or the bottom, and a clamping plate having a plate portion having forward and rearward faces and a central bolt receiving hole through which said through bolt is received, a pair of grooved ribs upon its rearward face extending between its side edges respectively above and below said hole thereof for complementary fitting engagement in said grooves of said clamp body, and a finger portion extending from one longitudinal edge of said plate portion adapted in one position to laterally oppose the top pad portion of said clamp body and in an inverted position to laterally oppose the bottom pad portion, and a clamping nut screwed upon said through bolt and engaged with said forward face of said clamping plate.

3. In a cable suspension clamp for mounting on a vertical pole, a horizontal through bolt for engaging diametrically through said pole with a threaded end projecting at one side, a clamp body comprising a forward wall having a vertical forward planar face and a central bolt receiving hole extending therethrough at right angles to said forward face through which said through bolt is received, said face having a pair of wire receiving grooves extending between its side edges and respectively spaced above and below said hole, the longitudinal edges of said grooves adjacent said hole being convexly arched and the other longitudinal edges being substantially straight and parallel to each other, upper and lower walls having outer surfaces convexly curved between their side edges and extending horizontally rearwardly from the upper and lower ends of said forward wall, and pole engaging pad portions respectively extending upwardly and downwardly from the rearward ends of said upper and lower walls, said clamp body being symmetrical above and below the axis of said hole whereby it presents an identical structure with either pad portion at the top or the bottom, and a clamping plate having a plate portion having forward and rearward faces and a central bolt receiving hole through which said through bolt is received, a pair of ribs upon its rearward face extending between its side edges respectively above and below said hole thereof, said ribs being convexly arched for complementary fitting engagement in said grooves of said clamp body and each having a wire receiving groove having arched parallel upper and lower sides to conform to and clampingly engage an arched messenger wire along upper and lower sides thereof when said messenger wire is engaged with the arched side of a complementary wire receiving groove of said clamp body, and a finger portion extending from one longitudinal edge of said plate portion adapted in one position to laterally oppose the top pad portion of said clamp body and in an inverted position to laterally oppose the bottom pad portion, and a clamping nut screwed upon said through bolt and engaged with said forward face of said clamping plate.

4. In a cable suspension clamp for mounting on a vertical pole, a horizontal through bolt for engaging diametrically through said pole with a threaded end projecting at one side, a clamp body having a hole through which said through bolt is received, a clamping plate having a hole through which said through bolt is received, and a nut screwed upon said bolt having clamping engagement with said clamping plate, said clamp body having a fulcrum groove at the upper side of said hole and a messenger wire receiving groove at the lower side of said hole, said messenger wire receiving groove of said clamp body having a substantially straight horizontal upper side and a convexly arched lower side whereby a messenger wire is engageable therewith in a substantially straight horizontal position and may thereupon assume a convexly curved position in engagement with the lower concexly arched side of said groove, and said clamping plate having fulcrum means for cooperation with said fulcrum groove of said clamp body and a messenger wire receiving groove having arched parallel upper and lower sides to conform to and clampingly engage said arched messenger wire along upper and lower sides thereof when said messenger wire is engaged with the lower arched side of said messenger wire receiving groove.

5. The invention as defined in claim 4, further characterized in that said clamp body has said fulcrum means at each of the opposite sides and said messenger wire receiving groove at each of its opposite sides, said messenger wire receiving grooves being of differential cross-sectional size to accommodate different sized wires through reversal of said clamp body upon said through bolt to dispose one or the other sides in opposed relation to said clamping plate.

References Cited by the Examiner
UNITED STATES PATENTS

| | | | |
|---|---|---|---|
| 2,334,560 | 11/43 | Kennedy | 248—66 X |
| 2,590,415 | 3/52 | Jenne | 248—66 |
| 3,042,353 | 7/62 | O'Mara | 248—74 |

CLAUDE A. LE ROY, *Primary Examiner.*

FRANK L. ABBOTT, *Examiner.*